US010457814B2

(12) United States Patent
Garcia et al.

(10) Patent No.: US 10,457,814 B2
(45) Date of Patent: Oct. 29, 2019

(54) AQUEOUS BINDER COMPOSITION FOR FIBRES AND FIBROUS PRODUCTS PRODUCED

(71) Applicant: SAINT-GOBAIN ADFORS, Courbevoie (FR)

(72) Inventors: Alexandre Garcia, Paris (FR); Louis Garnier, Paris (FR)

(73) Assignee: SAINT-GOBAIN ADFORS, Courbevoie (FR)

(*) Notice: Subject to any disclaimer, the term of this patent is extended or adjusted under 35 U.S.C. 154(b) by 50 days.

(21) Appl. No.: 15/538,105

(22) PCT Filed: Dec. 22, 2015

(86) PCT No.: PCT/FR2015/053701
§ 371 (c)(1),
(2) Date: Jun. 20, 2017

(87) PCT Pub. No.: WO2016/102875
PCT Pub. Date: Jun. 30, 2016

(65) Prior Publication Data
US 2018/0201791 A1    Jul. 19, 2018

(30) Foreign Application Priority Data

Dec. 22, 2014 (FR) ..................... 14 63064

(51) Int. Cl.
| C09D 1/04 | (2006.01) |
| C09D 5/02 | (2006.01) |
| C08L 83/04 | (2006.01) |
| C03C 25/42 | (2006.01) |
| D06N 5/00 | (2006.01) |
| C03C 25/465 | (2018.01) |
| C09D 7/65 | (2018.01) |
| C08L 53/02 | (2006.01) |
| D06N 7/00 | (2006.01) |
| B44D 3/18 | (2006.01) |

(52) U.S. Cl.
CPC ............... *C09D 1/04* (2013.01); *C03C 25/42* (2013.01); *C03C 25/465* (2018.01); *C08L 53/02* (2013.01); *C08L 83/04* (2013.01); *C09D 5/024* (2013.01); *C09D 7/65* (2018.01); *D06N 5/00* (2013.01); *B44D 3/18* (2013.01); *D06N 7/0002* (2013.01)

(58) Field of Classification Search
CPC .. C09D 1/04; C09D 5/024; C09D 7/65; C08L 83/04; C08L 53/02; C03C 25/42; C03C 25/465; D06N 5/00; D06N 7/0002; B44D 3/18
See application file for complete search history.

(56) References Cited

U.S. PATENT DOCUMENTS

| 3,778,283 A * | 12/1973 | von Freyhold ......... C04B 24/12 106/603 |
| 4,341,559 A * | 7/1982 | Friedemann ............ B22C 1/167 106/162.2 |
| 4,512,808 A * | 4/1985 | Pesch .................. C04B 24/2664 524/5 |
| 7,652,087 B2 * | 1/2010 | Dimanshteyn ........... C09D 5/18 523/179 |
| 2009/0304938 A1* | 12/2009 | Gurke ................... B29C 67/248 427/387 |
| 2011/0300359 A1 | 12/2011 | Blanchard et al. |

FOREIGN PATENT DOCUMENTS

| AU | 2014208991 B2 * | 7/2014 |
| CH | 703 166 A2 | 11/2011 |
| DE | 10 2007 007 318 A1 | 8/2008 |
| GB | 2385856 A * | 9/2003 |
| JP | 59-64582 A * | 4/1984 |
| JP | 2008-239856 A | 10/2008 |
| WO | WO 2007/086574 A1 | 8/2007 |
| WO | WO 2009/093002 A2 | 7/2009 |
| WO | WO 2010/070248 A2 | 6/2010 |

OTHER PUBLICATIONS

International Search Report dated Apr. 18, 2016 in PCT/FR2015/053701 filed Dec. 22, 2015.

* cited by examiner

*Primary Examiner* — Anthony J Green
(74) *Attorney, Agent, or Firm* — Oblon, McClelland, Maier & Neustadt, L.L.P.

(57) ABSTRACT

An aqueous inorganic or hybrid binder composition includes (as % by weight of the solid matter): from 55 to 100% of at least one alkali metal silicate exhibiting an Si/alkali metal weight ratio which varies from 0.3 to 2, from 0 to 35% of at least one plasticizing agent, and from 0 to 10% of one or more additives. Fibrous products can obtained from this composition, in particular based on mineral fibers, such as mats, screens, woven fabrics, in particular painter's canvases, and knitted fabrics.

22 Claims, No Drawings

AQUEOUS BINDER COMPOSITION FOR FIBRES AND FIBROUS PRODUCTS PRODUCED

The present invention relates to aqueous binder compositions for fibers and to the fibrous products thus obtained.

The invention more particularly relates to an aqueous inorganic or hybrid binder composition for the manufacture of products in the form of mats or of woven fabrics comprising mineral fibers, in particular glass or rock fibers. The mats are used in particular to prepare asphalt-coated membranes and as surface element for acoustic and/or thermal insulation products based on mineral wool. The woven fabrics are intended to form wall coverings, in particular painter's canvases.

The mats of mineral fibers (also known as "nonwovens" or "veils") can be manufactured according to the known processes operating by the dry route or by the wet route.

In the dry-route process, molten mineral matter present in a furnace is conveyed towards a group of bushings from which filaments flow out by gravity and are drawn by a gaseous fluid. The mineral filaments are collected on a conveyor, where they become entangled with the formation of a mat.

An organic binder is applied to the upper face of the mat thus formed using an appropriate device, generally operating by curtain coating, and the excess of the organic binder is removed by suction on the opposite face. The mat subsequently enters a device comprising hot air, the temperature of which, of the order of 200 to 250° C., is adjusted in order to remove the water and to crosslink the organic binder in a very short time, of the order of approximately ten seconds to 1 minute, and then the mat of mineral fibers is collected in the form of a roll.

In the wet-route process, the mat is obtained from an aqueous dispersion of cut mineral fibers which is deposited, by means of a forming head, on a conveyor provided with perforations and the water is extracted through the conveyor by virtue of a suction box. The cut mineral fibers remaining on the conveyor form a mat which is treated under the same thermal conditions as those described for the dry-route process.

In the abovementioned processes, the role of the organic binder is to bind the mineral fibers to one another and to confer, on the mat in which they are present, mechanical properties suitable for the desired use, in particular a stiffness sufficient to allow it to be easily handled without risk of tearing.

The organic binder applied to the mineral fibers is generally provided in the form of an aqueous solution including at least one thermosetting resin and additives, such as a catalyst for the crosslinking of the resin, a silane (coupling agent), a water repellent, and the like. The most commonly used thermosetting resins are urea/formaldehyde, melamine/formaldehyde and phenol/formaldehyde resins which exhibit the advantage of efficiently binding the fibers while being inexpensive. However, these resins are capable of giving off formaldehyde during the manufacture of the mat of fibers (during the heat treatment) but also after their final installation. Because the toxic effects of formaldehyde are established, regulations on the subject are being tightened and require manufacturers to provide alternative compositions devoid of formaldehyde.

As a result of their organic nature, the abovementioned binders can be burnt away on contact with a flame and consequently the resistance to fire of a mat of fibers containing these binders is low. The addition of flame retardants to the binder has already been proposed in order to improve the resistance to fire of the mat. Such flame retardants are in particular halogenated compounds and metal oxides. However, the halogenated compounds generate emissions of volatile organic compounds, some of which can be toxic, and the metal oxides degrade the mechanical performance of the binders in which they are present. Furthermore, these flame retardants are relatively expensive.

Hybrid compositions, combining organic and inorganic compounds, exhibiting a good resistance to fire are known.

US 2012/0277381 discloses a hybrid polyester resin which can be applied to synthetic textiles, such as a woven polyester fabric. The resin is obtained by reaction with a polyester resin, silica particles and an alkoxysilane.

In DE 10 2007007318, a description is given of a coating composition for textiles having a direct or indirect biological effect on organisms. The composition comprises a) a sol of a film-forming agent in the form of nanoparticles formed by hydrolysis or co-hydrolysis of silica and/or of metal compounds and b) a bioactive compound, such as an oil, a natural substance in the form of a thick liquid or solid in water or a water-miscible organic solvent.

WO 2011/128526 discloses a hydraulic binder for agglomerating or consolidating solid particles of any form, including fibers. The binder comprises an alkali metal silicate in aqueous solution, a surfactant and a natural triglyceride.

It is an aim of the present invention to provide an alternative solution to the conventional binder compositions for fibers, in particular mineral fibers, based on formaldehyde-containing thermosetting resins which makes it possible to confer a better resistance to fire on the fibrous product obtained, while retaining good mechanical properties, in particular an acceptable stiffness and an acceptable tensile strength.

This aim is achieved by virtue of an aqueous inorganic or hybrid binder composition which comprises (as % of the solid matter):
  from 55 to 100% by weight of at least one alkali metal silicate exhibiting an Si/alkali metal weight ratio which varies from 0.3 to 2,
  from 0 to 35% by weight of at least one plasticizing agent, and
  from 0 to 10% by weight of one or more additives.

In the present invention, the term "aqueous inorganic binder composition" is understood to mean a composition essentially containing an alkali metal silicate and water. In the same way, an "aqueous hybrid binder composition" is a composition containing the alkali metal silicate, the plasticizing agent or the reaction product of these two compounds, and water.

The alkali metal silicate in accordance with the invention is included among the "soluble" silicates which do not have a specific chemical formula and a specific molecular weight but are regarded as "glasses" resulting from the combination of alkali metal oxide and silica in variable proportions. The general formula of the soluble silicates is $M_2O \cdot xSiO_2$, in which M represents Na or K and x is the molar ratio (MR) defining the number of moles of silica ($SiO_2$) per mole of alkali metal oxide ($M_2O$). In the field of the invention, use is made of the weight ratio (WR) $SiO_2:M_2O$, which is defined by the following relationships:
  for the sodium silicates: WR=MR/1.032,
  for the potassium silicates: WR=MR/1.566, and
  in the present invention, the weight ratio (WR) $SiO_2:M_2O$ is denoted by "Si/alkali metal weight ratio".

The alkali metal silicate according to the invention is preferably chosen from potassium or sodium silicates and advantageously potassium silicates.

It has been found that the Si/alkali metal weight ratio has a direct effect on the stiffness of the fibrous product: the higher said ratio, the greater the stiffness. Generally, the Si/alkali metal weight ratio varies from 0.3 to 2.0, is preferably greater than 0.5 and better still varies from 1.2 to 1.6.

When the silicate is a sodium silicate, the Si/Na weight ratio preferably varies from 1.0 to 2.0 and advantageously from 1.5 to 2.0.

When the silicate is a potassium silicate, the Si/K weight ratio preferably varies from 1.0 to 1.6 and advantageously from 1.3 to 1.5.

The Si/alkali metal weight ratio can be precisely adjusted by using a mixture of several alkali metal silicates with different Si/alkali metal weight ratios.

The alkali metal silicate is generally in the form of an aqueous solution exhibiting a pH which varies from 9 to 13 and preferably from 10 to 12.

The role of the plasticizing agent is to filter into the silica network formed from the alkali metal silicate and to reduce its stiffness, thus giving a more flexible binder.

The plasticizing agent is preferably chosen from the group consisting of copolymers of styrene and butadiene, homopolymers and copolymers of alkyl (meth)acrylates, in particular poly(butyl acrylate), copolymers of alkyl (meth)acrylates and styrene, copolymers of (meth)acrylic acid and styrene, poly(vinyl acetate)s, silicones, such as poly(dimethylsiloxane)s, and siliconates, in particular potassium siliconates, especially potassium methyl siliconate.

The plasticizing agent generally exhibits a glass transition temperature (Tg) of less than 0° C. It has to be soluble in the aqueous alkali metal silicate solution and be stable at the pH of the latter.

As indicated above, the amount of plasticizing agent in the binder composition represents at most 35% by weight of the solid matter. Beyond this value, a deterioration in the mechanical properties of the fibrous product, in particular in the stiffness (the product is too flexible and cannot be appropriately handled), and a decrease in the resistance to fire are observed. Preferably, the amount of plasticizing agent is at most equal to 25% by weight of the solid matter.

When the binder composition contains a poly(dimethylsiloxane), the latter is present in a proportion of at most 2% by weight of the solid matter in order not to excessively reduce the stiffness of the fibrous product. Preferably, the amount is at most equal to 1%.

The binder composition in accordance with the invention can also comprise up to 10% by weight of the solid matter of one or more suitable additives, for example an agent for coupling between the alkali metal silicate and the plasticizing agent, an antifoaming agent, a pigment, a mineral filler, a dispersant agent, in particular for the mineral filler, a thickener and a biocide.

A particularly advantageous coupling agent, in particular for coupling the alkali metal silicate and a copolymer of styrene and butadiene, is bis(3-triethoxysilylpropyl) tetrasulfide.

The binder composition is generally provided in the form of an aqueous solution or dispersion.

The inorganic or hybrid binder can be applied to fibers in order to form fibrous products, which products constitute another subject matter of the present invention.

The fibers can be of any nature, for example mineral fibers composed of glass or of a rock, in particular basalt; organic fibers, such as synthetic fibers, in particular polyester and polyolefin fibers, such as a polypropylene; and natural fibers, such as cellulose fibers, in particular cotton, flax, sisal and hemp fibers, and animal fibers, such as wool and silk. The fibers can be a mixture of several fibers of different natures. Preferably, the fibers are mineral fibers, in particular glass fibers.

The fibers can be fibers of variable length according to their chemical nature. In particular, the fibers can be continuous or cut.

The fibrous product can be in the form of a mat of mineral fibers.

Conventionally, in order to prepare mats of mineral fibers, the inorganic or hybrid binder is deposited on the mat of mineral fibers (formed by the dry route or the wet route) and then the mat is treated at a temperature which makes possible the formation of an infusible binder. The treatment takes place at a temperature which generally varies from 180 to 250° C., preferably from 200 to 220° C., and for a very short period of time, of the order of a few seconds to a few minutes.

The length of the mineral fibers is at most equal to 150 mm and preferably varies from 20 to 100 mm and advantageously from 50 to 70 mm. Their diameter can vary within wide limits, for example from 5 to 30 µm.

The mineral fibers are both filaments and yarns composed of a multitude of filaments bonded together, in particular by a size (base yarns). The mineral fibers can also be assemblies of the abovementioned base yarns in the form of rovings. The base yarns and the rovings can be twist-free yarns or twisted yarns (or textile yarns), preferably twist-free yarns.

The linear density of the mineral fibers composed of the abovementioned yarns can range from 34 to 1500 tex.

The glass participating in the composition of the filaments can be of any type, for example C, E, R or AR (alkali-resistant). The glass C and the glass E are preferred.

The mat of fibers can, if appropriate, be reinforced by continuous fibers which are generally deposited on the device for conveying the mat in the direction of forward progression of the mat and are distributed over all or part of the width of the mat. These fibers are generally deposited in the thickness of the mat of fibers, in particular mineral fibers, before the application of the inorganic or hybrid binder.

The reinforcing fibers are generally made of glass.

The mat of fibers according to the invention generally exhibits a weight per unit area which varies from 10 to 1100 g/m$^2$, preferably from 30 to 350 g/m$^2$ and advantageously from 35 to 80 g/m$^2$.

The mat of fibers, in particular mineral fibers, in accordance with the invention generally includes from 5 to 50% by weight of inorganic or hybrid binder, preferably from 10 to 45%.

The mat of mineral fibers obtained in accordance with the present invention can be used in particular to manufacture roofing elements, for example asphalt-coated membranes or shingles.

Said mat can in particular be combined with another material, different from said mat, to form a laminated complex which exhibits good mechanical properties in terms of breaking strength, dimensional stability, resistance to delamination and flexibility.

In this case, the mat of mineral fibers is combined with a structure of woven glass yarns, for example a woven fabric, a screen or a knitted fabric by means of an organic binder, in particular based on a urea/formaldehyde resin, or an inorganic binder, and the combination is bonded by rolling. The woven fabrics and the screens of glass yarns are preferred.

Generally, the application of the binder is carried out by passing the mat and/or the structure of woven glass yarns into a bath containing the organic or inorganic binder.

Preferably, the mat participating in the composition of the complex has a weight per unit area which varies from 10 to 120 g/m$^2$, advantageously from 30 to 70 g/m$^2$.

The weight per unit area of the laminated complex obtained varies from 30 to 250 g/m$^2$ and preferably from 80 to 180 g/m$^2$.

The binder represents from 5 to 50% of the weight of the final complex and preferably from 10 to 30%.

Asphalt can subsequently be applied to all or part of at least one of the faces of the complex obtained in order to obtain an asphalt-coated membrane for a roof.

The mat of mineral fibers in accordance with the present invention can also be used as surfacing element for thermal and/or acoustic insulation products based on mineral wool, or for low-density boards or plaster boards.

To this end, the mat of glass fibers or the laminated complex described in the preceding paragraphs is coated with a composition having the consistency of an aqueous slurry which comprises from 10 to 90% by weight of at least one sodium or potassium silicate and from 10 to 90% by weight of a mineral filler, preferably calcium carbonate.

In addition, the coating composition can comprise up to 50% by weight of a latex of a copolymer of styrene and butadiene or (meth)acrylic acid, or of a homopolymer of vinyl acetate or (meth)acrylic acid, and up to 10% by weight of conventional additives, such as a thickener, a hydrophobizing agent, a wetting agent and pigments.

Preferably, the application of the coating composition to the abovementioned mat or complex is carried out by coating by means of a knife, and it is followed by a stage of drying, for example at a temperature of 160 to 190° C. for a period of time varying from 30 seconds to 5 minutes.

The weight per unit area of the mat of glass fibers and of the laminated complex before the application of the coating composition is identical to that described above for the manufacture of the roofing elements.

The coating composition is applied to the mat of glass fibers or the laminated complex in a proportion of 50 to 400 g/m$^2$ and preferably 200 to 300 g/m$^2$.

The binder composition in accordance with the invention can also be applied to screens, woven fabrics or knitted fabrics composed, in all or part, of mineral yarns, in particular glass yarns. Woven fabrics intended to form wall coverings, in particular in the form of a painter's canvas comprising glass yarns composed of a plurality of glass filaments coated with an organic binding composition, are targeted in particular. The application of the binder composition to the painter's canvas makes it possible to form a coating layer which adheres to the organic size and exhibits good resistance to fire.

The painter's canvases are preferably composed of glass yarns exhibiting a linear density which varies from 50 to 500 tex, advantageously from 100 to 350 tex, and exhibiting a weight per unit area which varies from 30 to 1000 g/m$^2$, preferably from 50 to 300 g/m$^2$ and advantageously from 75 to 200 g/m$^2$.

The amount of binder in accordance with the present invention applied to the painter's canvas represents from 5 to 50% of the total weight of the painter's canvas and preferably from 10 to 45%.

The examples which follow make it possible to illustrate the invention without, however, limiting it.

In these examples, the fibrous product is subjected to the following tests:

the tensile strength of the fibrous product, expressed in N, is measured under the conditions of the standard NF EN ISO 13934-1. The measurement is carried out on ten samples with a length of 25 cm and a width of 5 cm. And the stiffness of the fibrous product is measured by means of a Lorentzen & Wettre device, at 23° C. and 50% relative humidity, on a rectangular sample (3.8 cm×8.0 cm). When a painter's canvas is concerned, the sample is cut in the machine direction (with respect to the direction of weaving).

The sample is held vertically at one end in the smallest dimension between two jaws and a horizontal force is applied to the free end (working length: 5.0 cm). The force applied (in mN) in order to achieve an angle of bending of 30° is measured. This force characterizes the stiffness of the fibrous product.

the resistance to fire is measured under the conditions of the standard NF EN ISO 11925-2. The propagation time (in seconds) over a distance of 15 cm and the propagation distance (in mm) are determined, for a flame applied at the surface or to the section of the sample.

EXAMPLES 1 TO 6

These examples illustrate the manufacture of mats of glass fibers.

Potassium silicate in aqueous solution, a latex of styrene/butadiene resin and optionally a polydimethylsiloxane are mixed in the proportions appearing in table 1, expressed as % by weight of the solid matter. The pH of the mixture is adjusted to 11 with sodium hydroxide solution. Water is added to the mixture, so as to obtain a content of solid matter equal to 15%.

A mat of fibers of glass C (Grade GF/C Glass Microfiber Filter Binder Free sold by Whatman) is impregnated by immersion in the abovementioned aqueous binder composition. After having removed the excess binder, the mat is placed in a drying oven at 200° C. for 3 minutes.

The properties of the mats obtained are given in table 1 in comparison with a mat treated with a melamine/formaldehyde resin (Reference) under the same conditions, except that the duration of the treatment in the drying oven is equal to 5 minutes.

Examples 1 and 3 exhibit a good tensile strength combined with a greater stiffness than that of the Reference. The addition of plasticizing agent makes it possible to reduce the stiffness of the mat (examples 2 and 4, to be compared with examples 1 and 3), without damaging the tensile strength (example 4).

Example 4 represents a good compromise between the tensile strength and the stiffness of the mat, similar to the performance of the Reference.

The presence of polydimethylsiloxane in example 5 makes it possible to reduce the stiffness of the mat by 74.7%, with respect to example 4, while retaining an acceptable tensile strength.

The stiffness of the mat of examples 1, 3 and 6 decreases when the Si/P ratio decreases. The choice of the Si/P ratio makes it possible to control the properties of the mat, both its tensile strength and its stiffness.

EXAMPLES 7 TO 14

A mat is manufactured under the conditions of examples 1 to 6, modified in that the binder composition has the composition given in table 2.

The mats of examples 7, 8, 10 to 12 and 14, and also the Reference mat, are subjected to the test of resistance to fire. The results appear in table 2.

Examples 7 to 10 and 14 according to the invention exhibit a similar tensile strength to the Reference, at an equivalent content of binder. The performances toward fire of the mats according to the examples are better than the Reference, whether in terms of propagation distance or of 15 cm propagation time.

EXAMPLES 15 TO 17

These examples illustrate the manufacture of painter's canvases.

The binder composition is prepared by mixing the compounds appearing in table 3, in proportions expressed as % by weight of the solid matter. The solid matter content in the aqueous binder composition is equal to 13%.

A painter's canvas composed of woven glass yarns is impregnated by immersion in the abovementioned binder composition. The painter's canvas is a woven fabric having a satin weave composed of 4.5 bulked yarns of 330 tex per cm, as weft, and 7.9 yarns of 68 tex per cm, as warp. The weight per unit area of the canvas is equal to 200 g/m$^2$.

After having removed the excess binder, the impregnated painter's canvas is placed in a drying oven at 200° C. for 90 seconds.

The amount of binder represents 20% of the weight of the painter's canvas obtained.

The properties of the painter's canvases obtained appear in table 3, in comparison with a painter's canvas treated under the same conditions with a melamine/formaldehyde resin (Reference).

The measurements of resistance to fire for examples 15 and 16 and the Reference are given in table 3.

Examples 15 and 16 exhibit a comparable stiffness to that of the Reference. The addition of a coupling agent (example 17) makes it possible to obtain a higher tensile strength and a higher stiffness than those of the Reference.

The properties of resistance to fire of examples 15 and 16 are far superior to those of the Reference.

TABLE 1

| Example | 1 | 2 | 3 | 4 | 5 | 6 | Ref. |
|---|---|---|---|---|---|---|---|
| Potassium silicate[1] | 100 | 75 | — | — | — | — | — |
| Potassium silicate[2] | — | — | 100 | 75 | 73 | — | — |
| Potassium silicate[3] | — | — | — | — | — | 100 | — |
| Styrene/butadiene copolymer[4] | — | 25 | — | 25 | 25 | — | — |
| Polydimethylsiloxane[5] | — | — | — | — | 2 | — | — |
| Content of binder (% by weight) | 47.2 | 47.0 | 43.1 | 47.6 | 43.8 | 45.0 | 45.0 |
| Tensile strength (N) | 86.7 | n.d. | 90.0 | 96.5 | 68.1 | 33.3 | 109.0 |
| Stiffness (mN) | 98.9 | 53.2 | 89.3 | 60.0 | 15.2 | 33.0 | 65.4 |

[1]Reference Betol ® K42T, sold by Woellner (weight ratio Si/P = 1.9; P meaning potassium),
[2]Reference Betol ® K5020T, sold by Woellner (weight ratio Si/P = 1.6; P meaning potassium)
[3]Reference Betol ® K57M, sold by Woellner (weight ratio Si/P = 0.6; P meaning potassium)
[4]Reference Lipaton ® SB 29Y46, sold by Synthomer (latex)
[5]Reference Betolin ® AH250, sold by Woellner
n.d.: not determined

TABLE 2

| | Example | | | | | | | | |
|---|---|---|---|---|---|---|---|---|---|
| Example | 7 | 8 | 9 | 10 | 11 (comp.) | 12 (comp.) | 13 (comp.) | 14 | Ref. |
| Potassium silicate[1] | — | — | — | — | — | — | — | 100 | — |
| Potassium silicate[2] | 100 | 90 | 80 | 70 | 60 | 50 | 25 | — | — |
| Styrene/butadiene copolymer[4] | — | 10 | 20 | 30 | 40 | 50 | 75 | — | — |
| Content of binder (% by weight) | 47.4 | 48.5 | 47.3 | 47.4 | 47.1 | 47.8 | 44.0 | 47.2 | 45.0 |
| Tensile strength (N) | 120.4 | 100.0 | 105.9 | 107.4 | 109.2 | 105.6 | 85.5 | 86.7 | 109.0 |
| Propagation distance (mm) | | | | | | | | | |
| Section | 15 | 40 | n.d. | 80 | Total | Total | n.d. | 20 | Total |
| Surface | 30 | 50 | n.d. | 70 | Total | Total | n.d. | 30 | n.d. |
| 15 cm propagation time (s) | | | | | | | | | |
| Section | n.f.p. | n.f.p. | n.d. | n.f.p. | 6 | 6 | n.d. | n.f.p. | 3 |
| Surface | n.f.p. | n.f.p. | n.d. | n.f.p. | 10 | 9 | n.d. | n.f.p. | n.d. |

[1]Reference Betol ® K42T, sold by Woellner (weight ratio Si/P = 1.9; P meaning potassium)
[2]Reference Betol ® K5020T, sold by Woellner (weight ratio Si/P = 1.6; P meaning potassium)
[4]Reference Lipaton ® SB 29Y46, sold by Synthomer (latex)
n.d.: not determined
n.f.p.: no flame propagation

TABLE 3

| | Example | | | |
|---|---|---|---|---|
| | 15 | 16 | 17 | Reference |
| Potassium silicate[(2)] | 100 | 75 | 75 | — |
| Styrene/butadiene copolymer[(4)] | — | 25 | 24 | — |
| Coupling agent[(6)] | — | — | 1 | — |
| Tensile strength (N) | 202.7 | 219.4 | 542.1 | 465.4 |
| Stiffness (mN) | 58.4 | 59.5 | 90.1 | 64.8 |
| Propagation distance (mm) | | | | |
| Section | 30 | 50 | n.d. | Total |
| Surface | 30 | 60 | n.d. | Total |
| 15 cm propagation time (s) | | | | |
| Section | n.f.p. | n.f.p. | n.d. | 9 |
| Surface | n.f.p. | n.f.p. | n.d. | 18 |

[(2)]Reference Betol® K5020T, sold by Woellner (weight ratio Si/P = 1.6; P meaning potassium)
[(4)]Reference Lipaton® SB 29Y46, sold by Synthomer (latex)
[(6)]Reference Si69, sold by Evonik Industries AG
n.d.: not determined
n.f.p.: no flame propagation

The invention claimed is:

1. A fibrous product coated with an aqueous inorganic or hybrid binder composition, wherein
   the product is in the form of a mat of mineral fibers, of a screen of mineral fibers, of a woven fabric of mineral fibers, or of a knitted fabric of mineral fibers, and
   the aqueous inorganic or hybrid binder composition comprises (as % by weight of solid matter):
      from 55 to less than 100% of at least one alkali metal silicate exhibiting an Si/alkali metal weight ratio which varies from 0.3 to 2,
      from more than 0 to 35% of at least one plasticizing agent chosen from the group consisting of copolymers of styrene and butadiene, homopolymers and copolymers of alkyl (meth)acrylates, copolymers of alkyl (meth)acrylates and styrene, copolymers of (meth)acrylic acid and styrene, poly(vinyl acetate)s, silicones, and siliconates, and
      from 0 to 10% of one or more additives.

2. The product as claimed in claim 1, wherein the alkali metal silicate is a potassium or sodium silicate.

3. The product as claimed in claim 1, wherein the alkali metal silicate has an Si/alkali metal weight ratio of greater than 0.5.

4. The product as claimed in claim 1, wherein the plasticizing agent has a glass transition temperature of less than 0° C.

5. The product as claimed in claim 1, wherein the proportion of plasticizing agent is at most equal to 25%.

6. The product as claimed in claim 1, wherein the plasticizing agent is a polydimethylsiloxane and its content is from more than 0 to 2%.

7. The product as claimed in claim 1, wherein said composition comprises more than 0% of said one or more additives, and wherein the one or more additives comprises bis(3-triethoxysilylpropyl) tetrasulfide.

8. The product as claimed in claim 1, wherein the product is in the form of a woven fabric of mineral fibers.

9. The product as claimed in claim 1, wherein the product is in the form of a mat of mineral fibers.

10. The product as claimed in claim 9, wherein the fibers exhibit a length at most equal to 150 mm.

11. The product as claimed in claim 9, wherein the product exhibits a weight per unit area which varies from 10 to 1100 g/m$^2$.

12. The product as claimed in claim 1, wherein the product includes from 5 to 50% by weight of inorganic or hybrid binder.

13. The product as claimed in claim 1, wherein the alkali metal silicate has an Si/alkali metal weight ratio that varies from 1.2 to 1.6.

14. The product as claimed in claim 9, wherein the fibers exhibit a length at from 50 to 70 mm.

15. The product as claimed in claim 9, wherein the product exhibits a weight per unit area which varies from 35 to 80 g/m$^2$.

16. The product as claimed in claim 1, wherein the product includes from 10 to 45% by weight of inorganic or hybrid binder.

17. The product as claimed in claim 1, wherein the at least one alkali metal silicate exhibits an Si/alkali metal weight ratio which varies from 0.3 to 1.5.

18. The product as claimed in claim 8, wherein the woven fabric of mineral fibers is a painter's canvas.

19. The product as claimed in claim 1, wherein the product is in the form of a screen of mineral fibers.

20. The product as claimed in claim 1, wherein the product is in the form of a knitted fabric of mineral fibers.

21. A fibrous product coated with a binder composition,
   wherein the fibrous product is a woven fabric which is provided in the form of a painter's canvas comprising glass yarns composed of a plurality of glass filaments, and wherein the binder composition is an aqueous inorganic or hybrid binder composition, comprising (as % by weight of solid matter):
      from 55 to 100% of at least one alkali metal silicate exhibiting an Si/alkali metal weight ratio which varies from 0.3 to 2,
      from 0 to 35% of at least one plasticizing agent, and
      from 0 to 10% of one or more additives.

22. The fibrous product as claimed in claim 21, wherein the glass yarns exhibit a linear density which varies from 50 to 500 tex and exhibits a weight per unit area which varies from 30 to 1000 g/m$^2$, and wherein the binder composition comprises from more than 0 to 35% of said at least one plasticizing agent.

* * * * *